UNITED STATES PATENT OFFICE.

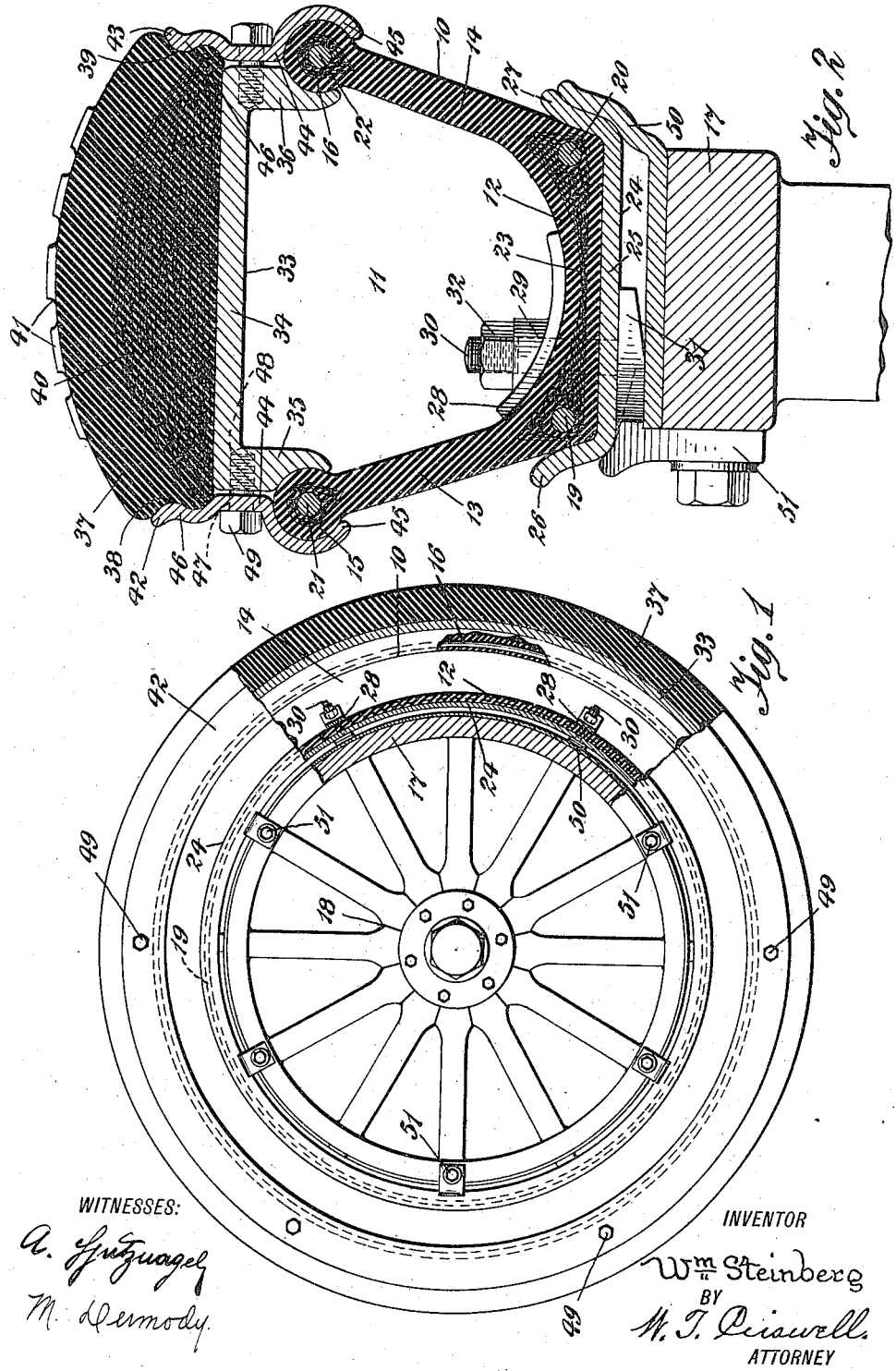

WILLIAM STEINBERG, OF JAMAICA, NEW YORK, ASSIGNOR OF ONE-THIRD TO DANIEL WEGNER, OF NEW YORK, N. Y.

COMPOUND RESILIENT TIRE.

1,260,727.     Specification of Letters Patent.     Patented Mar. 26, 1918.

Application filed February 1, 1915. Serial No. 5,550.

*To all whom it may concern:*

Be it known that I, WILLIAM STEINBERG, a subject of the Czar of Russia, and a resident of Jamaica, county of Queens, and State of New York, have invented a certain new and useful Improvement in Compound Resilient Tires, of which the following is a full, clear, and exact specification.

This invention relates to a class of devices adapted to be used in conjunction with vehicles.

My invention has for its object primarily to provide a form of tire designed to be utilized on the wheels of automobiles and like vehicles whereby a cushion-like action or resiliency will be attained as well as serving to obviate the tendency of being punctured as is incident to the pneumatic tires ordinarily used, and which is adapted to be made so as to be efficiently employed on both passenger automobiles and auto-trucks without requiring the use of an inner pneumatic tube. The invention consists mainly of an annular grooved or flanged member of rubber, or other resilient material which is preferably substantially semi-hexagonal in shape, as viewed transversely, to permit an air-chamber, or cushion to be provided, and the tendency of this resilient member to expand and contract circumferentially when in use is limited by embedding therein a number of annular metal rods.

Other objects of the invention are to provide on the transverse part of the annular semi-hexagonal resilient member a ferrule, or grooved concentric supporting plate for permitting the resilient member to be detachably fastened on the wheel of the vehicle, to provide means for fastening the resilient member against movement to the ferrule; to provide between the free edges of the flanges of the resilient member an annular rigid bridging member, or plate for holding the flanges in uniform spaced relation; to provide on the bridging member an annular resilient or yielding tread member; and to provide clamps, or annular retaining strips for detachably holding the tread member on the bridging member, and to detachably hold the bridging member to the flanges of the resilient member.

A further object of the invention is to provide a tire of simple and efficient construction, and which may be made so as to combine great strength and durability.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a side view of a vehicle wheel partly in section showing one form of resilient tire embodying my invention applied thereto, and Fig. 2 is an enlarged sectional view taken through the tire and through the rim of the wheel.

The compound resilient tire has an annular grooved, or flanged member 10 which may be made of rubber, or other resilient material, and this resilient annular member is preferably substantially semi-hexagonal in shape, as viewed transversely, to permit an air-chamber, or pneumatic cushion, as 11, to be provided as well as forming the transverse part, or base 12 thereof with a flat inner side and forming outwardly diverging flanges 13 and 14 the edges of which terminate with circular-shaped beadings 15 and 16, respectively. The annular semi-hexagonal resilient member 10 is made of a size so that the transverse part, or base 12 is somewhat wider than the felly 17 of the wheel 18 of an automobile, or like vehicle, and the flanges 13 and 14 are formed to extend a suitable distance beyond the periphery of the wheel. In a passage lengthwise through the annular resilient member 10 at the juncture of its flange 13 with its base 12 is disposed an annular metal rod 19, and in a passage lengthwise through the resilient member 10 at the juncture of its flange 14 with its base is a second annular metal rod 20. In a passage lengthwise through the beading 15 of the flange 13 is a third annular metal rod 21, and in a passage lengthwise through the beading 16 of the flange 14 is a fourth annular metal rod 22. The rods 19, 20, 21, 22 may be cut, and the resilient member may likewise be cut for permitting the rods to be passed through the passages of the resilient member after which the ends of the rods may be welded or soldered and the ends of the resilient member may be cemented together, or these parts may be combined by a suitable process of molding. These rods are tightly held in the passages of the resilient member to limit the tendency of the member to expand or contact circumferentially when in use, and in order to reinforce the resilient member in its base 12 and in the beading of the flanges 13 and 14 may be embedded layers, as 23, of canvas, or other suitable material.

To permit the annular semi-hexagonal resilient member 10 to be detachably fastened on the wheel of a vehicle, a ferrule, or grooved concentric supporting plate 24 preferably of metal is provided. The concentric supporting plate 24 has a transverse part 25, and the lengthwise edges of this plate are bent outwardly to form two curved diverging flanges 26 and 27, the space between which provides an annular groove in which rests the base 12 of the resilient member 10.

Serving as means to fasten the resilient member 10 against movement to the supporting plate 24, on the outer periphery of the transverse part of this member is arranged a curved concentric strip 28 having a number of spaced bosses 29 projecting therefrom. Through the strip and through each of the bosses 29 as well as through the resilient member 10, and also through the transverse part of the concentric supporting plate 24 are registered holes in each set of which is passed a bolt 30 having a head 31 abutting against the inner side of the transverse part 25 of the supporting plate 24, and on the opposite threaded end of each of these bolts is a tightening nut 32 which is screwed into engagement with the boss of its bolt, thus fastening the annular resilient member 10 to the grooved concentric supporting plate 24.

For the purpose of holding the flanges 13 and 14 of the annular semi-hexagonal resilient member 10 in uniform spaced relation as well as closing the space between the free edges of these flanges to provide the air-chamber, or pneumatic cushion 11, between the beading 15 and 16 of the flanges is removably disposed an annular rigid bridging-member, or plate 33 preferably of metal. The bridge-plate 33 has a transverse portion 34 disposed crosswise with respect to the flanges of the resilient member 10, and projecting from the edges of the transverse portion of the bridge-plate inwardly between the flanges of the resilient member are two annular flanges 35 and 36 which are spaced a sufficient distance apart so that the flanges 13 and 14 of the resilient member abut thereagainst for being uniformly spaced apart. The outer surfaces at the free edge portions of the flanges 35 and 36 of the bridge-plate 33 are grooved, as shown, and in these grooves are respectively disposed the beading 15 and 16 of the flanges of the resilient member 10. In this manner the transverse portion 34 of the bridge-plate 33 and also part of the flanges 35 and 36 extend some distance beyond the peripheral plane of the resilient member, and this bridge-plate further serves to close the annular groove of the resilient member to provide the air-chamber, or pneumatic cushion 11, thereby allowing the use of an inner pneumatic tube to be dispensed with.

On the periphery of the rigid bridging-member, or plate 33 is an annular tread member 37 which may be approximately semi-circular in shape, in cross-section, and in the edges of this tread member are concentric grooves, as at 38 and 39. The tread member 37 when the tire is used in conjunction with the wheels of an automobile for carrying passengers may be made of rubber, or leather, or other resilient material. When the tread member is made of rubber a series of layers of canvas, as 40, or other similar material is preferably embedded in the part adjacent to its inner side during the molding of the member so as to strengthen it, and on the curved tread surface of the member may be formed a suitable number of teats, or knobs 41 to prevent the wheel from skidding.

In order to detachably hold the tread member 37 on the bridge-plate 33 and for also removably holding the bridge-plate to the beading of the flanges 13 and 14 of the annular resilient member 10, I provide two clamps, or concentric retaining rings, as 42 and 43, both of which are similarly formed. Each of the concentric retaining rings 42 and 43 has a straight radially disposed central part 44, and extending inwardly from the inner edge of each of these straight central parts is a concentric substantially semi-circular flange 45 taken cross-sectionally. The flanges 45 engage the outer surfaces of the beading of the flanges 13 and 14 of the resilient member 10 in hook-like fashion, thus clamping the beading between the flanges of the retaining rings 42 and 43 and the flanges of the bridge-plate 33. Extending outwardly from the outer edge of the straight central part 44 of each of the retaining rings 42 and 43 is a second concentric flange 46, and both of these flanges are substantially S-shaped in cross-section, as shown, so as to snugly engage the concentric grooves 38 and 39 as well as the inner part of the edges of the semi-circular tread member 37. Through spaced intervals of the straight central part 44 of each of the retaining rings 42 and 43 are a number of holes 47, and in corresponding parts of the exterior surface of each of the flanges of the bridge-plate 33 are threaded sockets 48 each of which being in register with one of the holes of the retaining rings. Through each of the holes of each of the retaining rings and screwed into its registering threaded socket of each of the flanges of the bridge-plate 33 is a bolt 49. By tightening the bolts 49 the retaining rings 42 and 43 will be directed toward the bridge-plate 33 for clamping the tread member 37 and the flanges 13 and 14 of the resilient member to the bridge-plate, or by loosening the bolts these parts of the tire may be separated.

When the resilient tire is applied to the wheel of an automobile the grooved concentric supporting plate 24 is disposed on the usual metal rim, as 50, of the felly 17 of the wheel so that the heads 31 of the bolts 30 will rest on this rim, and the tire is then removably secured on the wheel by means of the usual forms of wedge-clamps, as 51, as ordinarily used for this purpose. Thus a simple and efficient form of compound resilient tire adapted to combine great strength and durability is provided for use on the wheels of automobiles and like vehicles to produce the required resiliency without requiring the employment of a pneumatic inner tube as well as serving to obviate the tendency of the tire to being punctured.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope of the appended claim.

Having thus described my invention, I claim as new and desire to secure by Letters Patent:—

A tire comprising an annular flexible and resilient member having a reinforced continuous transverse portion, two continuous outwardly extending and diverging side flanges, each flange having a reinforced annular bead at the free edge thereof, a flat annular bridge member of rigid material spanning the space between the side flanges, said bridge member having inwardly extending continuous side flanges with grooves in the outer side faces thereof receiving the beads of the resilient member flanges, an annular tread member mounted on the bridge member and having curved sides, annular rings arranged at each side of the bridge member, said rings each having an inner continuous flange substantially arc-shaped in cross-section engaging the bead of one of the resilient member flanges and a curved outer continuous flange engaging a curved side of the tread member, and means carried by said rings between their flanges and engaging said bridge member for drawing said rings toward said bridge member to clamp said beads of the resilient member flanges in the grooves of the bridge member flanges and to secure the tread member on said bridge member.

This specification signed and witnessed this thirtieth day of January, A. D. 1914.

WILLIAM STEINBERG.

Witnesses:
   ROBT. B. ABBOTT,
   DANIEL WEGNER.

Copies of this patent may be obtained for five cents each, by addressing the "Commissioner of Patents, Washington, D. C."